INVENTOR.
KENNTH D. RELYEA

May 19, 1970 K. D. RELYEA 3,512,858
APPARATUS AND METHOD FOR PREPARING AND DISTRIBUTING INDIVIDUAL
DOSAGE UNITS OF PHARMACEUTICAL MATERIALS
Filed July 29, 1968 3 Sheets-Sheet 2

INVENTOR.
KENNTH D. RELYEA
BY
Francis J. Kremblas Jr.
ATTORNEY

United States Patent Office 3,512,858
Patented May 19, 1970

3,512,858
APPARATUS AND METHOD FOR PREPARING
AND DISTRIBUTING INDIVIDUAL DOSAGE
UNITS OF PHARMACEUTICAL MATERIALS
Kenneth D. Relyea, 3309 Hoover,
Grove City, Ohio 44302
Filed July 29, 1968, Ser. No. 748,257
Int. Cl. A47b 67/00
U.S. Cl. 312—234.5                    2 Claims

ABSTRACT OF THE DISCLOSURE

An apparatus and method for the preparation for distribution of individual dosage units of pharmaceutical materials including a portable housing provided with a plurality of distribution trays removably mounted therein. Each of the distribution trays includes a plurality of container openings adapted to receive a container carrying a unit dose of a predetermined pharmaceutical material. The trays also include a plurality of slots disposed between the container openings which are arranged in parallel rows for removably receiving a plurality of cards identifying the patients to whom the container will be delivered and which are arranged in a predetermined order to facilitate the delivery of the containers.

---

The present invention relates generally to apparatus for the preparation and distribution of predetermined dosage units of pharmaceutical materials and particularly to a novel container means and associated structures for a novel and more efficient method of preparing and distributing such materials.

In general, the apparatus of the present invention comprises a portable housing means provided with an opening for access to a plurality of tracks mounted in the housing. A plurality of distribution trays are removably mounted on the tracks in the housing. Each distribution tray includes a plurality of rows of openings or recesses, each adapted to receive a container carrying a predetermined individual dosage unit of a particular pharmaceutical material. The containers are arranged in the tray in a predetermined order preferably relating to the order of the arrangement of the patients who are to receive the particular dosage unit. Each distribution tray includes a pair of upraised ribs forming a slot between each row of recesses adapted to receive means for the identification of the patients being served.

Prior to the present invention, nursing homes and similar institutions, obtained prescription orders from a pharmacy in the same manner as the individual who seeks the filling of an occasional prescription. However, the large number of patients in a nursing home, and the normal frequency of receiving medication required by such patients creates unique problems both for the pharmacist and the nursing personnel of the institution.

For example, the nurses must keep separate facilities for each patient to store the various types of pharmaceutical materials that each patient may be receiving. Then according to each prescription, the nurse must remove an individual dosage unit for distribution to each patient at each prescribed time during each day. This may occur three or four times a day for some prescriptions. A typical institution of this type having fifty to one hundred patients make such a procedure a very time consuming task.

As each prescription order runs out or a new one is obtained, the pharmacist would receive a relatively large volume of orders which were difficult to fill in the time required to supply the patients needs.

As one aspect of the present invention the pharmacist may deliver individual dosage units of the prescribed pharmaceutical material to the institution in an efficient and much more reliable manner without substantially affecting his ability to serve his normal flow of business from individual customers.

As another aspect of the present invention, the nursing personnel at the institution are not required to store prescribed medication for each patient and then remove a single dosage unit from a total prescription amount each time the medication must be given to the patient. This eliminates one time consuming task from the nursing services that the patients require.

As still another aspect of the present invention, more reliable control over both the type and amount of the prescribed materials is possible using the apparatus and method of the present invention.

It therefore is an object of the present invention to provide apparatus of the type described which facilitates the handling of large volumes of prescription orders of pharmaceutical materials to nursing homes and the like, and also reduces the likelihood of serious errors relating to the preparation or the delivery of the improper medication to the patient.

It is another object of the present invention to provide apparatus of the type described which increases the efficiency of the pharmacist, in filling large volumes of prescription orders on a unit dosage basis, without substantially interfering with the normal flow of everyday business.

It is another object of the present invention to provide apparatus of the type described which facilitates the distribution of the individual dosage units to the patients by the personnel responsible for the ultimate delivery of the pharmaceutical material to the patient.

Figure 1:
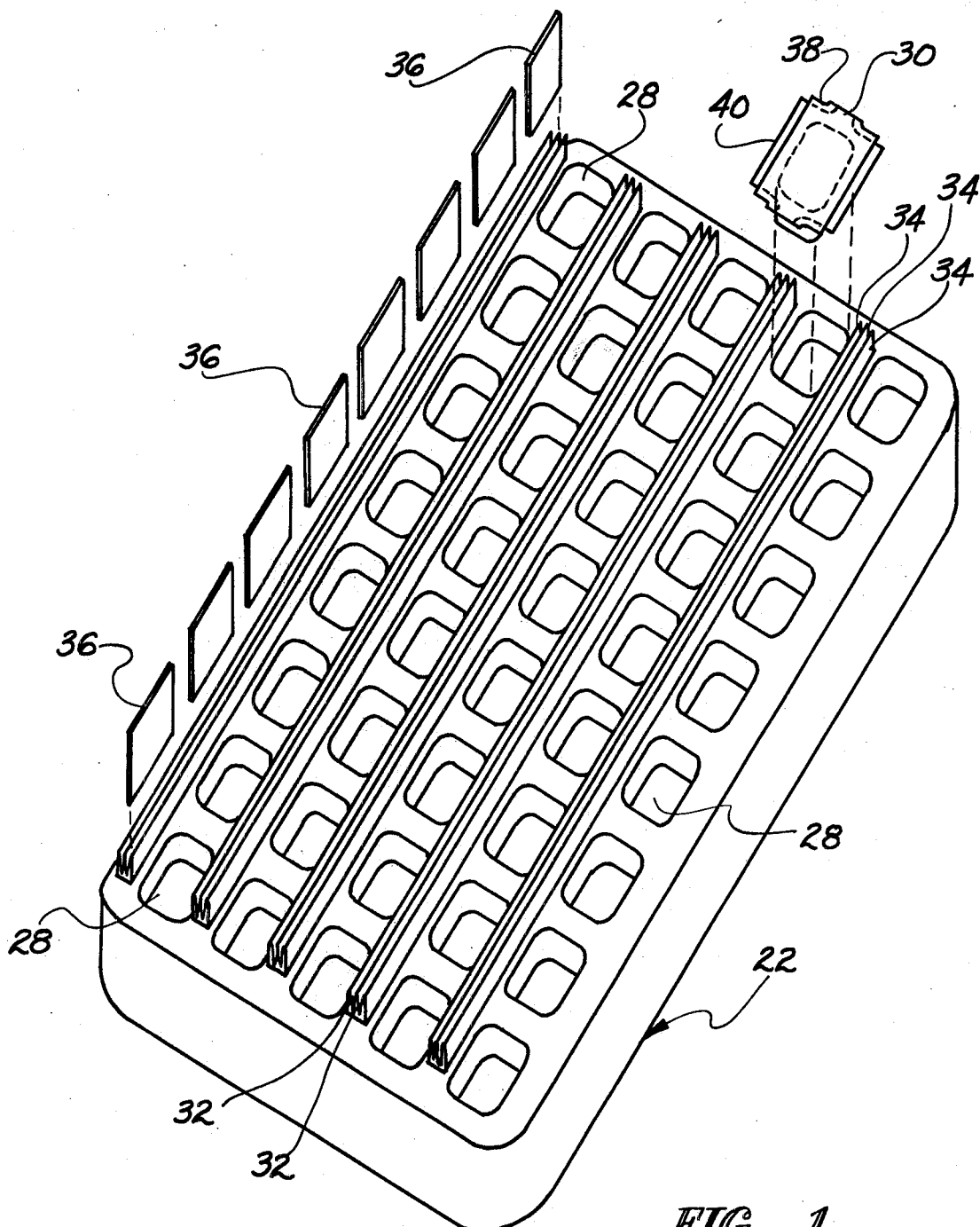
FIG. 1 is a perspective view of a portion of the apparatus of the present invention illustrating a distribution tray and containers constructed in accordance with the present invention.
Figure 2:
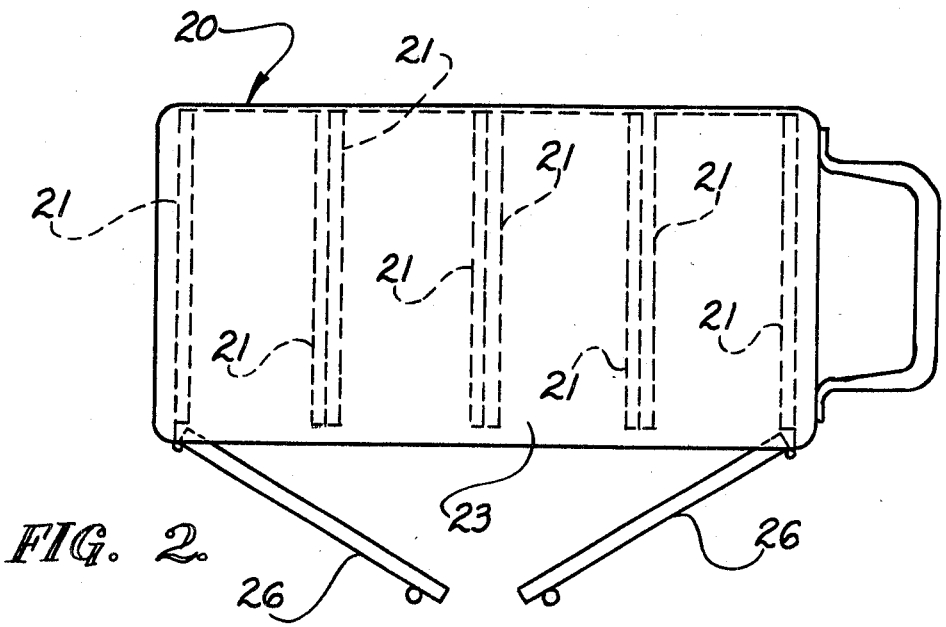
FIG. 2 is a top plan view of the apparatus of the present invention illustrating the housing means for the distributing trays.
Figure 3:
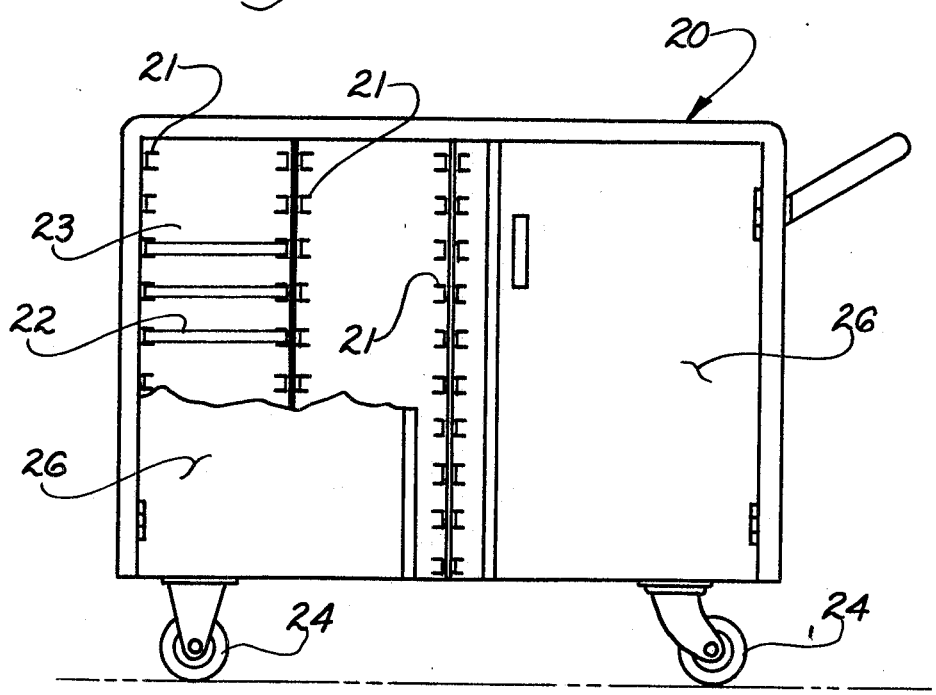
FIG. 3 is a front elevation view of the housing means shown in FIG. 2 illustrated with a portion of the door shown broken away to present view of the inner portion of the housing means.

Referring in detail to the drawings, apparatus for the preparation for distributing of predetermined dosage units of pharmaceutical materials constructed in accordance with the present invention is illustrated in FIGS. 1–3 and includes a portable housing means or cabinet, indicated generally at 20, and a plurality of distribution trays, indicated generally at 22.

Housing means 20 is provided with two pairs of wheels 24 to facilitate delivery of the housing and its contents to the institution being served and to facilitate the final distribution of the pharmaceutical materials to the patients.

A pair of hinged doors 26 provided access to the interior of housing means 20 and a plurality of distribution trays 22 mounted therein through a side wall opening 23.

Doors 26 are preferably provided with a conventional locking means, not shown, to insure the security of the materials contained therein during and after delivery.

Referring specifically to FIG. 1 each tray 22 includes a plurality of container receiving openings or recesses 28 arranged in parallel rows. Each opening 28 is adapted to receive a container 30.

Each tray 22 includes a pair of slots 32 formed by upraised ribs 34 and disposed adjacent to each row and are adapted to removably receive a plurality of cards 36 carrying indicia to identify the patients and the pharmaceutical materials being served.

The number of longitudinal and horizontal rows of recesses 28 in a given tray is preferably determined relative to the number of patients and rooms on a given floor or in a given section of the nursing institution being served. In this manner, each tray 22 represents a particular area of the institution and the cards 36 may be arranged in a predetermined order to facilitate the administration of the medication to the patient by a nurse carrying a tray 22.

Containers 30 are preferably formed from a transparent plastic material and include a label portion 38 bonded to a lip portion 40 surrounding the opening 42 to the container to close the container.

Label portion 38 carries indicia, not shown, identifying the pharmaceutical material disposed therein.

Figure 4:
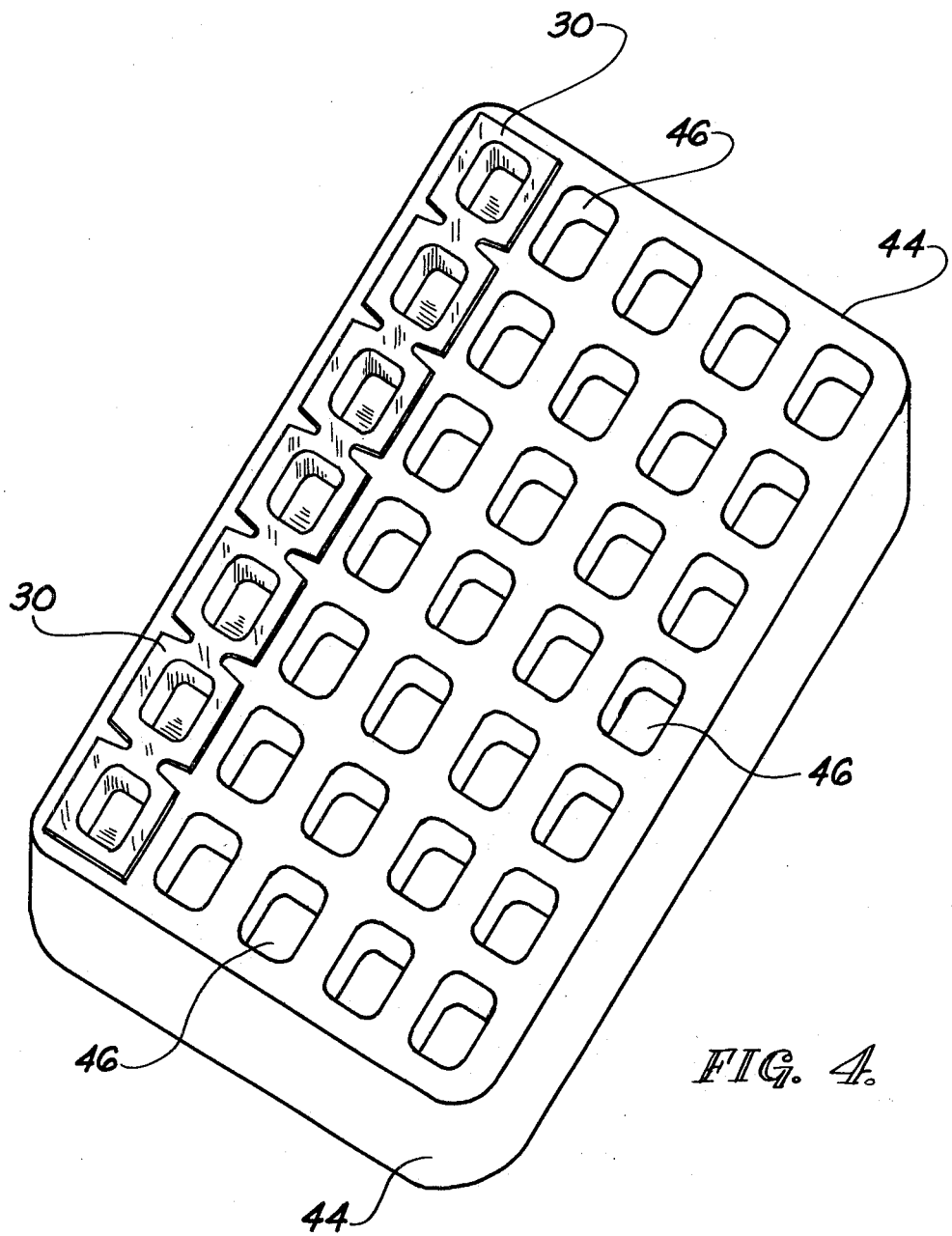
FIG. 4 is a perspective view of a typical loading tray and container means used in accordance with the present invention.

Preferably containers 30 are constructed in rows with each container being removably connected to adjacent containers as seen in FIG. 4. Such construction is described in detail in my co-pending application filed on even date herewith and greatly facilitates the preparation of a loading tray 44 such as shown in FIG. 4. The number of container 30 in a connected row preferably coincides with the number of container holding means in the form of openings or the like 46 in a row of loading tray 44.

If the aforementioned preferred construction of containers 30 is used, each loading tray 44 is prepared by placing the prescribed dosage unit of a given pharmaceutical material in each container 30 in the row. Then a previously prepared strip of label material provided with the appropriately spaced indicia identifying that material is positioned over the recesses 42 in the entire row of containers 30. The containers are then placed in a row of the loading tray. When all the rows of the tray 44 are so filled, the loading tray may then be stored in a convenient manner, preferably where it may be easily reached when a container 30 is to be removed therefrom.

If however the above described construction of containers 30 is not used, the preparation is the same, but the task is more time consuming when individual containers 30 must be placed in each recess 46.

Of course, the containers 30 can be placed in an opening 46 of tray 44 before the pharmaceutical material is placed in each container and the label portion fixed in position over the opening 42 without departing from the spirit of the present invention.

When all the pharmaceutical materials needed are prepared as described above, the daily preparation of the distribution trays becomes a relatively easy task.

Each distribution tray 22 is prepared first by placing a patient identity card 36 in one of slots 32 adjacent to a respective recess 28. The identity cards are arranged in a predetermined order preferably coinciding with the arrangement of the patients in the institution being served, therefore greatly aiding the distribution of each dosage to the patients.

Then according to the prescription orders for each patient, the appropriate container 30 is removed from a loading tray 44 and placed in the recess 28 adjacent to the appropriate patient identity card 36.

It is desirable to label each distribution tray to correspond to a given time period and a given section of the institution corresponding to the location of the patients whose identity cards are in slots 32 of that tray. This provides ready identification to the nurses who are to distribute the dosage units.

When the required number of distribution trays are prepared, for example a one day supply, they are arranged in order of the time and section of the institution on a respective one of tracks 21 in housing means 20.

Assuming each housing means 20 has at least a capacity capable of holding a one day supply of materials, it may be delivered to the nursing home the day before or early the same morning the materials are scheduled for distribution to the patients.

Upon arrival at the institution, housing means 20 is delivered to the nursing personnel. All that is required of the nursing personnel then, is the distribution of the individual dosage units to the patients at each prescribed time period.

As a matter of control, the nurses should check their own patient files against the label portion of each container 20 to make certain that the proper medication for each patient is disposed in the recess 28 opposite the patient identity card 36.

If the institution has cards made up with the patients names and the type of medication that is prescribed for the patient, this card may be placed in the second slot 32 provided on the distribution tray before the containers 30 are delivered to the patients.

Since housing means 20 is portable, it may be rolled quite easily through the halls of the institution to locations where each distributing tray 22 may be removed and carried into the patient's room.

As each tray 22 is emptied, it is placed back on tracks 21. When all the trays 22 are emptied and placed back in the housing means 20, the housing means may be sent back to the pharmacy and the procedure repeated.

With at least two housing means 20 and the appropriate number of trays 22, it can be readily understood that this type of daily delivery of individual dosage units can be accomplished in a reliable, continuous manner to provide more convenient and efficient service to the institution and to the patients without undue interruption of the pharmacist's regular customer service to individuals.

Since it is not unusual for a prescription order to be changed by the attending physician before the total order is used by the patient, the patient was required to pay for the total prescription order which was delivered in bulk when the materials were prepared using prior methods and means. However, using the apparatus and method of the present invention, the patient need only pay for the individual dosage units delivered. Therefore, if a prescription order is halted before the total number of individual doses are given the patient, the patient realizes considerable savings compared to the prior method of servicing such institutions.

Further, it should be pointed out that if an error does occur in the preparation of an individual dosage unit, the error is more likely to be discovered sooner in the preparation of the daily dosage units as compared to the discovery of the same error occurring in the delivery of the total prescription in bulk. In the latter case, it is likely that the error may not be discovered until the material is reordered and the patient has taken the total prescription order. However using the apparatus and method of the present invention, it is likely that such an error would be discovered the following day since each dosage unit is individually checked each day by both the pharmacist and the nursing personnel.

From the above description, it should be readily apparent that the apparatus and method of the present invention permits a pharmacist to offer more efficient and reliable service in delivering individual dosage units of pharmaceutical materials to such institutions in a relatively convenient manner without substantial interference with the normal flow of his business and with greater benefit to the patients in such institutions.

It is also important to point out that since a substantial number of prescription orders delivered to the aforementioned institutions call for narcotic materials, theft is a constant threat. However, this threat is substantially reduced by the delivery of small quantities such as individual dosage units which are not very attractive to potential thieves.

I claim:

1. An apparatus for the preparation and distribution of predetermined dosage units of pharmaceutical materials comprising, in combination, housing means provided with wheel means and at least one side wall opening; a plurality of track means mounted in said housing; a plurality of trays removably mounted on said track means through said side wall opening, each of said trays including a plurality of container receiving openings spaced from one another in substantially parallel rows and a pair of slots disposed adjacent to a respective one of said rows; and a plurality of card-like strips provided with predetermined indicia disposed in one of said slots adjacent to a respective container receiving openings in a predetermined order.

2. An apparatus for the preparation and distribution of individual dosage units of pharmaceutical materials comprising, in combination; portable housing means including at least one side wall opening and a plurality of trays slideably mounted in said housing, each of said trays including a plurality of container receiving openings spaced from one another in substantially parallel rows and a slot means disposed adjacent to the container receiving openings in a respective one of said rows; said openings adapted to removably receive a container for individual dosage units of pharmaceutical materials and said slot means adapted to removably receive a plurality of cardlike strips provided with predetermined indicia.

References Cited

UNITED STATES PATENTS

| | | | |
|---|---|---|---|
| 2,530,220 | 11/1950 | Belcher | 312—234 X |
| 3,262,747 | 7/1966 | Kotzek et al. | 312—234.5 |
| 3,305,283 | 2/1967 | MacKay | 312—198 |

CASMIR A. NUNBERG, Primary Examiner

U.S. Cl. X.R.

312—198